United States Patent [19]
Doi et al.

[11] Patent Number: 5,499,395
[45] Date of Patent: Mar. 12, 1996

[54] CELLULAR MOBILE COMMUNICATION SYSTEM HAVING APPARATUS FOR CHANGING BOUNDARIES OF CELLS ACCORDING TO TRAFFIC CONDITION

[75] Inventors: Nobukazu Doi, Hachioji; Takashi Yano, Tokorozawa, both of Japan

[73] Assignee: Hitachi, Ltd., Tokyo, Japan

[21] Appl. No.: 207,688

[22] Filed: Mar. 9, 1994

[30] Foreign Application Priority Data

Mar. 11, 1993 [JP] Japan .................. 5-050393

[51] Int. Cl.⁶ .................................................. H04Q 7/30
[52] U.S. Cl. .................. 455/33.1; 455/56.1; 370/74
[58] Field of Search ............................. 455/56.1, 33.1, 455/33.2, 33.4, 54.1, 69; 370/74, 110.4

[56] References Cited

U.S. PATENT DOCUMENTS

| | | | |
|---|---|---|---|
| 4,197,496 | 4/1980 | Hiyama | 370/74 |
| 4,435,840 | 3/1984 | Kojima et al. | 455/56.1 |
| 4,669,107 | 5/1987 | Eriksson-Lennartsson | 455/33.4 |
| 4,759,051 | 7/1988 | Han | 379/59 |
| 5,241,685 | 8/1993 | Bodin et al. | 455/56.1 |
| 5,241,686 | 8/1993 | Charbonnier | 455/56.1 |
| 5,276,907 | 1/1994 | Meidan | 455/56.1 |

FOREIGN PATENT DOCUMENTS

| | | |
|---|---|---|
| 0418096 | 3/1991 | European Pat. Off. . |
| 0466543A1 | 1/1992 | European Pat. Off. . |
| 0505341A2 | 9/1992 | European Pat. Off. . |
| 3022632 | 1/1991 | Japan . |

OTHER PUBLICATIONS

Basic of Mobile Communication: The Institute of Electronics, Information and Communication Engineers of Japan, Published in May, 1991 pp. 188–217.

Primary Examiner—Edward F. Urban
Attorney, Agent, or Firm—Antonelli, Terry, Stout & Kraus

[57] ABSTRACT

Cellular mobile communication system includes a plurality of base stations connected to a relay station, each base station having adaptability for coping with change in traffic volume within a relevant cell covered thereby. Each base station includes a variable gain power amplifier for amplifying a pilot signal and a power control circuit for controlling the gain of the power amplifier. The power control circuit controls gain of a pilot signal sending power in accordance with a control signal supplied from a device installed in a relay station for monitoring traffic states of the individual base stations. The relay station issues a command for lowering the power gain for the base station which covers a traffic-concentrated cell while raising the power gain for the base stations covering the neighboring cells, to thereby contract the size of the traffic-concentrated cell. With a smaller number of base stations, communication demand can be controlled over a broad area.

15 Claims, 10 Drawing Sheets

F I G. 1
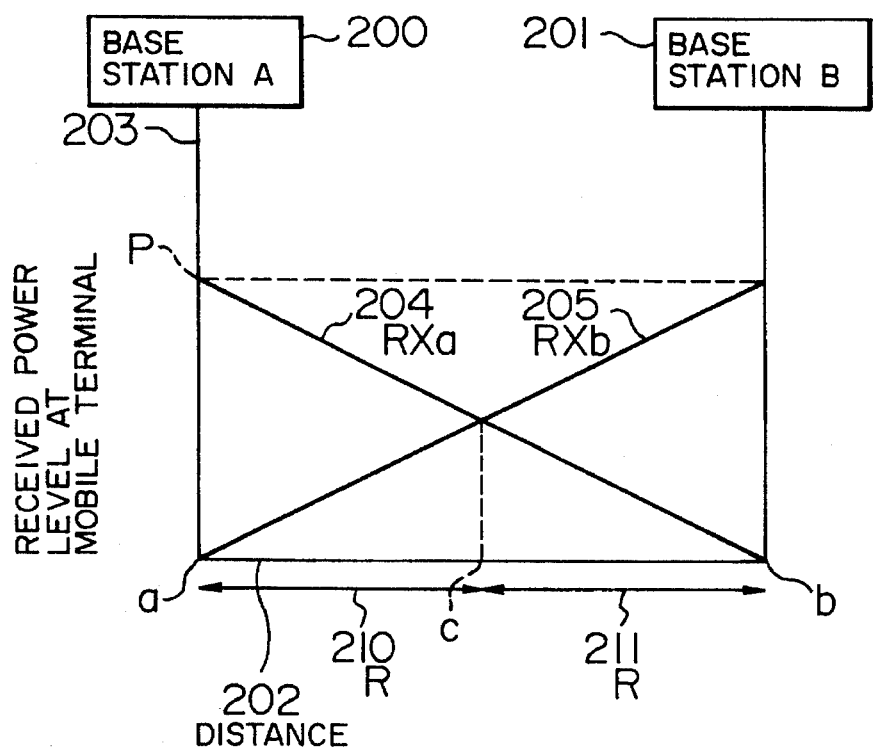
F I G. 2
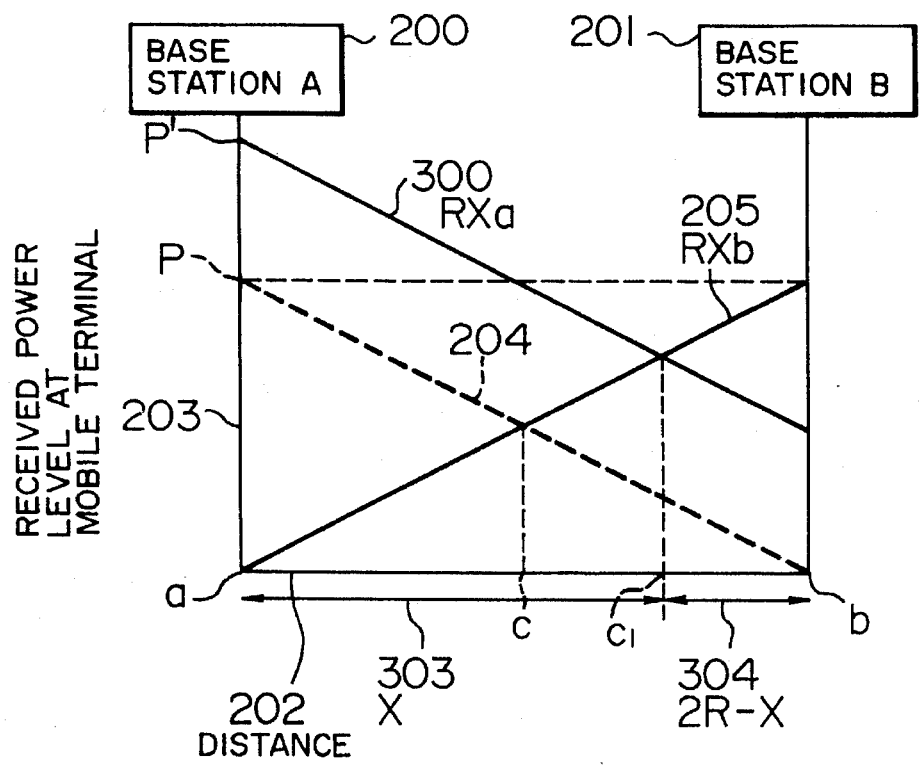

| | NUMBER OF CONCURRENT ACCESSES | CONTROL SIGNAL |
|---|---|---|
| CELL 800a | 9 | −Δ |
| CELL 800b | 1 | 0 |
| CELL 800c | 2 | 0 |

F I G. 11

| | NUMBER OF CONCURRENT ACCESSES | CONTROL SIGNAL |
|---|---|---|
| CELL 800a | 9 | 0 |
| CELL 800b | 1 | +Δ |
| CELL 800c | 2 | +Δ |

F I G. 12

| | NUMBER OF CONCURRENT ACCESSES | CONTROL SIGNAL |
|---|---|---|
| CELL 800a | 9 | −Δ |
| CELL 800b | 1 | +Δ |
| CELL 800c | 2 | +Δ |

F I G. 14
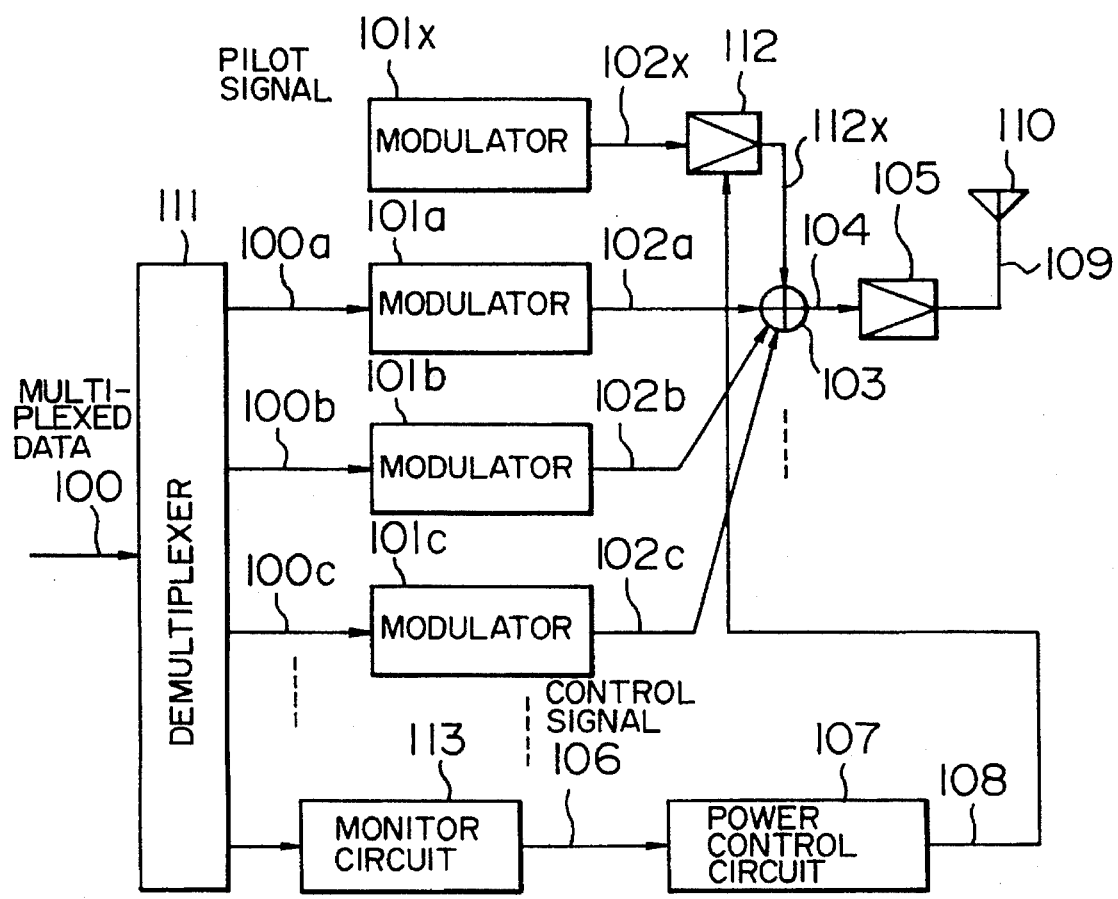

F I G. 16
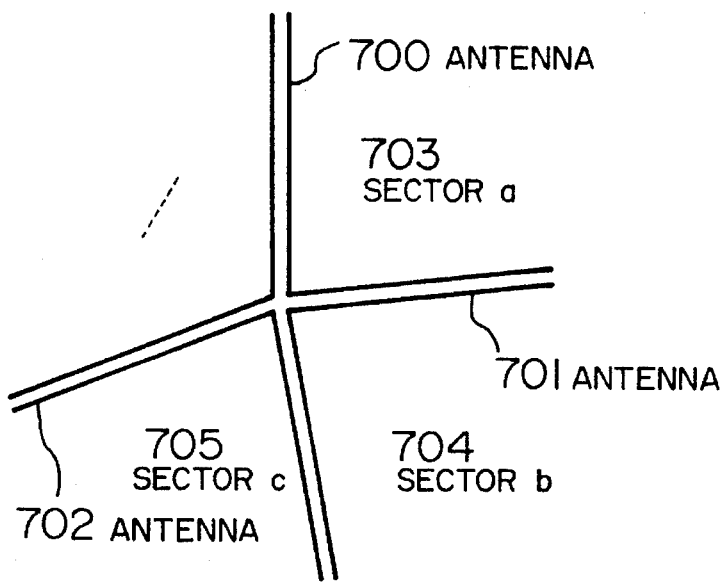
F I G. 17
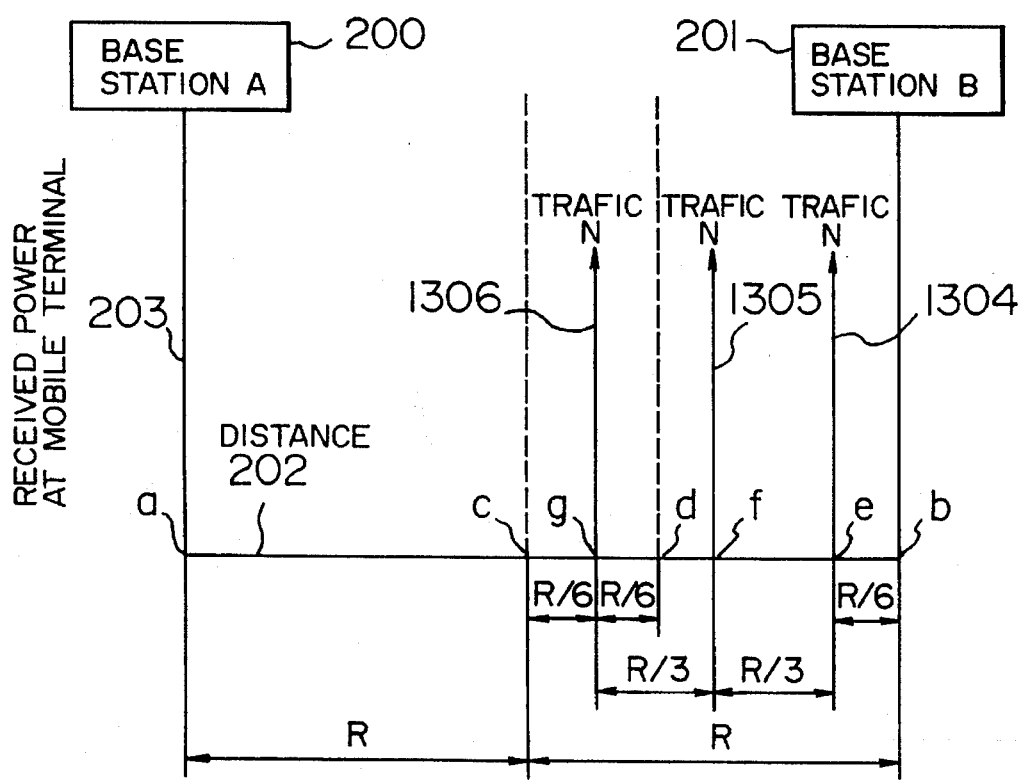

CELLULAR MOBILE COMMUNICATION SYSTEM HAVING APPARATUS FOR CHANGING BOUNDARIES OF CELLS ACCORDING TO TRAFFIC CONDITION

BACKGROUND OF THE INVENTION

The present invention relates to a cellular mobile communication system.

In the cellular mobile communication system, areas in which of mobile terminals are capable of communication are divided into a plurality of cells which neighbor with or partially superpose onto one another. A plurality of mobile terminals located within a cell can make access concurrently to the associated one of base stations which are disposed on a cell-by-cell basis to thereby allow communications between the mobile terminals as well as the mobile terminals and stationary or fixed terminals. In order that a number of mobile terminals within a given cell can make access concurrently to one base station which controls that cell, the technique for avoiding interference among the communication channels plays a very important role in the cellular mobile communication system. Communication systems have been proposed that address the problem of inter-channel interferences such known system and for example:

(1) a frequency division multiple access (FDMA) system, (2) a time-division multiple access (TDMA) system, (3) a code-division multiple access (CDMA) system, and (4) a hybrid system corresponding to a combination of the above-mentioned systems (1) to (3).

According to the FDMA system, a frequency band used for communication with the mobile terminals is divided into a plurality of bands. The base station within a given cell allocates useable bands to a plurality of mobile terminals, respectively, so that communication can be carried out without incurring superposition of spectrums. On the other hand, according to the TDMA scheme, a plurality of mobile terminals can perform communication with the base station in such a manner that signals do not temporally overlap with one another in a same carrier frequency band. Further, in the CDMA system, specific codes are allocated to the individual mobile terminals, respectively. The sender station sends a signal modulated with the codes dispersed therein by using a same carrier frequency, while the receiver station identifies the desired channel by detecting synchronism with the code allocated to that station.

In general, the electromagnetic wave signal emitted in the air undergoes attenuation as the distance from the sender station increases, approximately in proportion to a power exponent of the distance and becomes covered with noise in the area far away from the sender station. Accordingly, in the areas which are sufficiently remote from one another, it is possible to perform communications by using electromagnetic waves of a same frequency independent of one another. This is the principle of cell repetition adopted in the cellular mobile communication system. In this case, the maximum number of the mobile terminals which can make access to one base station concurrently does not depend on the size or area of the cell. Under the circumstances, there is adopted in some cellular mobile communication systems a so-called micro-cellulation scheme for decreasing the radius or radii of the individual cells as one of the methods for coping with the increase in the traffic volume.

Parenthetically, the principle of the cell repetition and the cellular mobile communication system are described in detail in Y. Okumura and M. Shinshi "IDOUTSUUSHIN NO KISO (BASIS OF MOBILE COMMUNICATION)": The Institute of Electronics, Information and Communication Engineers of Japan, pp.188–217, published in May, 1991.

One of the problems encountered in practical application of the cellular mobile communication system is seen in that the traffic volume in each cell will vary significantly depending on the locations or places and time zones. By way of example, a residential district covered by one cell and a commercial district of another cell may remarkably differ from each other in respect to the traffic even when both cells have a same area or size. Further, in a place located around the railway station or a stadium, the traffic volume will become different between a rush-hour zone and the other time zones or between the event-hour zone and other time zones for between a fixture day and other).

However, the cellular mobile communication system known heretofore is so designed that the radii as well as the areas of the cells controlled by the respective base stations are equal to one another without exception, wherein the micro-cellulation (or cell contraction) is effected with reference to a district where the traffic is maximum. As a consequence, there arises unavoidably such situation where the number of cells becomes insufficient or excessive regardless of the actual call demand in dependence on the locations and/or time zones, incurring increase in the cost involved in services and maintenance of basic equipment due to increase in the number of the base stations as well as complication of the system due to registration of locations of the mobile terminals and the liken thus giving rise to problems.

SUMMARY OF THE INVENTION

In the light of the state of the art described above, it is an object of the present invention to provide a cellular mobile communication system and a radio base station which can satisfactorily cope with time-and/or location-dependent changes of the traffic volume.

Another object of the present invention is to provide a cellular mobile communication system which can cover a large service area with a smaller number of base stations when compared with the system known heretofore and which has adaptability to variations or changes in the traffic volume within the individual cells. With the invention, it is also contemplated to provide an improvement of a radio base station for such cellular mobile communication system.

In view of the above and other objects which will become apparent as description proceeds, there is provided according to an aspect of the present invention a cellular mobile communication system in which sending power levels of pilot signals are changed relative to one another among base stations which are positionally adjacent to one another, to thereby change inter-cell boundaries formed around the base stations, respectively, in dependence on the states or levels of traffic. By way of example, when the number of mobile stations or mobile terminals within a given cell increases at least approximately to such a traffic level that the capacity of the relevant base station for the multiple or concurrent accesses thereto station is no more available, the pilot signal sending powers of the base station having the control over that given cell and the neighboring base stations are changed relatively to each other, to thereby shift the inter-cell boundary so that the area of that given cell is reduced (i.e., micro-cellulated). As a result of the micro-cellulation, the mobile stations or terminals located in the periphery of the given cell undergone the micro-cellulation are equivalently moved into the cells covered by the neighboring base stations. Thus, the traffic load is adjusted between or among the base stations located adjacent to one another.

Each of the base stations constituting the cellular mobile communication system according to the present invention includes an amplifier of a variable gain for amplifying a modulated pilot signal, a modulator for modulating data to be sent, a sending unit for combining and broadcasting the modulated data in the form of electromagnetic wave in the air, and a gain control circuit for controlling the gain of the variable gain amplifier, wherein the gain control means controls the sending power of the pilot signal in response to a control signal supplied thereto in dependence on change in the traffic state. In this conjunction, the control signal for controlling the sending power of the pilot signal may be obtained from a traffic monitor provided in a repeater or relay station which serves to connect a plurality of base stations to a network or alternatively the control signal may be generated internally of the base station by providing the traffic monitor in each base station.

The inter-cell boundary is determined by the strengths of the electric fields (power levels) of the pilot signals emitted from two base stations positionally neighboring with each other. For example, so long as the power level of the pilot signal emitted from a base station A is higher than that of the pilot signal from another base station B which neighbor the base station A, a mobile terminal receiving these pilot signals can communicate with other terminals through the medium of the base station A, while the mobile terminal performs communication via the base station B when the pilot signal power level relation mentioned above is reversed. Thus, by shifting the inter-cell boundary by changing relatively the sending powers of the pilot signals of the neighboring base stations according to the teaching of the invention to thereby transfer control of the mobile terminals within a given cell of high traffic intensity dispersely or distributively to the base stations of the peripheral or neighboring cells, it is possible to adjust the communication load so as to conform with the capabilities or serviceability of the individual base stations.

The foregoing and other objects, advantages, manner of operation and novel features of the present invention will be understood from the following detailed description when read in connection with the accompanying drawings.

BRIEF DESCRIPTION OF THE DRAWINGS

FIG. 1 is a schematic diagram illustrating an inter-cell boundary between neighboring base stations in a normal operation mode of a cellular mobile communication system according to the invention;

FIG. 2 is a schematic diagram for illustrating an inter-cell boundary control according to a first embodiment of the invention;

FIG. 11 is a view showing a traffic manage table for the case where the inter-cell boundary control scheme according to the first embodiment of the invention is adopted;

FIG. 12 is a view showing a traffic manage table for the inter-cell boundary control corresponding to the third embodiment of the invention;

FIG. 14 is a schematic diagram showing a configuration of a transmitter system in a base station according to another embodiment of the invention;

FIG. 16 is a schematic diagram showing a structure of a sector antenna which can be adopted in carrying out the invention; and FIG. 17 is a diagram for illustrating operation of a cellular mobile communication system to which the CDMA scheme is adopted applied according to still another embodiment of the invention.

DESCRIPTION OF THE PREFERRED EMBODIMENTS

Figure 3:
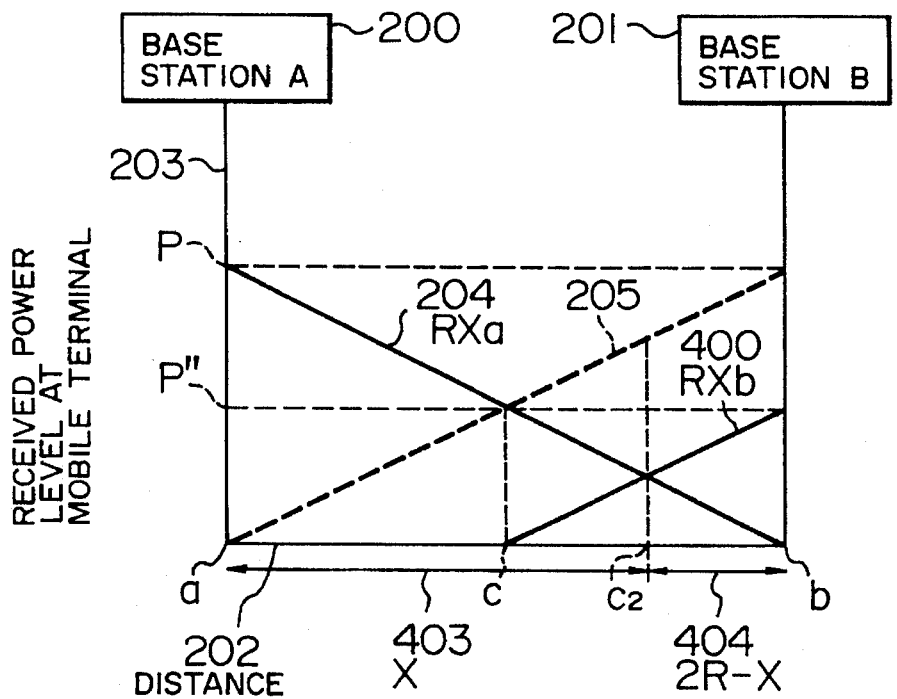
FIG. 3 is a schematic diagram for illustrating an inter-cell boundary control according to a second embodiment of the invention.

Now, the present invention will be described in detail in conjunction with preferred or exemplary embodiments thereof by reference to the drawings.

Referring to FIGS. 1 to 4, description will first be directed to inter-cell boundary control methods according to the invention.

FIG. 1 is a schematic diagram illustrating an inter-cell boundary (cellular border) in a normal mode or state between a base station A 200 and a base station B 201 which constitute parts of a cellular mobile communication system according to the present invention.

In FIG. 1, distance between the base stations and a mobile terminal is taken along the abscissa, while electric field intensity or power levels of pilot signals received by the mobile terminal is taken along the ordinate, wherein curves RXa 204 and RXb 205 represent received power level (field strength) characteristics of the pilot signals emitted from the base stations A and B (200 and 201), respectively.

Ordinarily, the sending powers at which the pilot signals are emitted from the base stations A 200 and B 201, respectively, are set to be equal to each other so that the power level of the pilot signal emitted from the base station A and received by the mobile terminal at a location a assumes a same level P as that of the pilot signal from the base station B received at a location b.

In the state mentioned above, the inter-cell boundary between a cell over which the base station A 200 has control and a cell controlled by the base station B 201 lies at a location c where the power levels of the pilot signals emitted from these two base stations are equal to each other. So far as these two base stations are of concern, a radius R 210 of the cell defined around the base station A 200 has a same value as the radius R 211 of the cell defined around the base station B 201. In general, the cellular mobile communication system is so designed that a mobile terminal can receive the pilot signals from a plurality of base stations, wherein when the electric field intensity or power level of the signal received from a given base station Y becomes higher than that of a base station X to which the mobile terminal has hitherto been connected (i.e., when the inter-cell boundary is attained), the base station to which the mobile terminal is to be connected (i.e., the base station to be accessed by that mobile station) is changed over from the base station X to the base station Y.

FIG. 2 shows a first exemplary embodiment of the invention which is directed to an inter-cell boundary control for micro-cellulation in a cellular mobile communication system.

Referring to FIG. 2, it is assumed that the cell covered by the base station B 201 is subject to the micro-cellulation because of increase in the traffic volume. In this case, the sending power of the pilot signal emitted from the neighboring base station A 200 is increased to thereby strengthen the electric field or power level for reception at the location a from the level P to a level P', which is then accompanied with change of the pilot signal reception power level characteristics RXa from that represented by the curve 204 to that represented by a characteristic curve 300.

Since the pilot signal power levels RXa and RXb upon reception thereof are equal to each others at a location c' for both the base stations A and B, the radius of the cell covered by the base station A 200 is broadened to a radius X 303 while that of the cell of the base station B 201 is contracted to a coverage given by 2R-X as indicated by 304 (this is a so-called micro-cellulation). Accordingly, of the mobile terminals which have been resident within the cell covered by the base station B up to that time point, the mobile terminals located within an area defined between c and $C_1$ are equivalently moved into the coverage or cell of the base station A, whereby the traffic within the cell covered by the base station B can be mitigated.

FIG. 3 is a diagram for illustrating an inter-cell boundary control for micro-cellulation according to a second embodiment of the invention.

In this case, it is also assumed that the cell covered by the base station B 201 is to be subjected to the micro-cellulation. It should however be noted that in contrast to the first embodiment, the received power level (electric field intensity) at the location b is lowered from the level P to a level P" by weakening or lowering the sending power of the pilot signal emitted from the base station B 201, whereby the received pilot signal power level characteristic RXb is changed from that represented by a broken characteristic curve 205 to that represented by a solid curve 400. As a result of this, the power level characteristic RXb for the pilot signal from the base station B 201 coincides with the characteristic RXa for the base station A 200 at the location $C_2$, whereby the radius X403 of the cell covered by the base station A 200 is increased while that of the cell controlled by the base station B 201 is decreased to a value Given by "2R-X", as indicated at 404 (i.e., micro-cellulation of the cell of the base station B 201).

Figure 4:
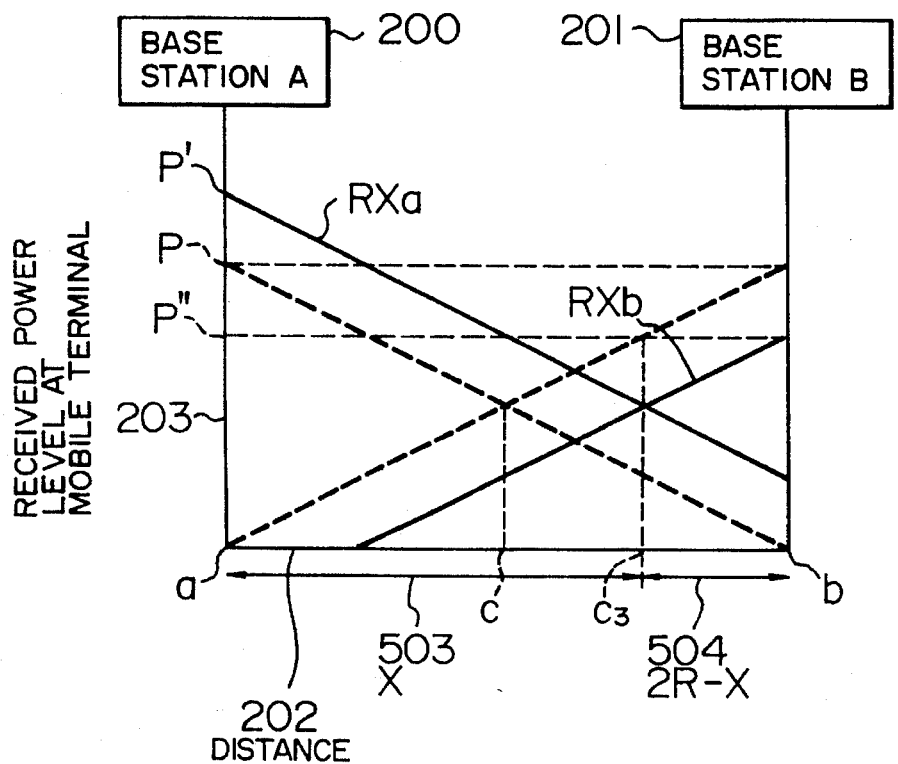
FIG. 4 is a schematic diagram for illustrating an inter-cell boundary control according to a third embodiment of the invention.

FIG. 4 is a schematic diagram illustrating the inter-cell boundary control for the micro-cellulation according to a third embodiment of the invention.

The control according to the instant embodiment corresponds to a combination of the first and second embodiments described above. More specifically, according to the invention incarnated in the third embodiment, the pilot signal sending power of the base station B 201 which is subjected to the micro-cellulation is weakened (P→P') when compared with the sending power in the normal mode (FIG. 1) while the pilot signal sending power of the base station A 200 which is in charge of controlling the adjacent cell is strengthened (i.e., P→P") as compared with that in the normal mode. Thus, the received power level characteristic RXb for the pilot signal emitted from the base station B 201 coincides With the characteristic RXa of the base station A 200 at the location $C_3$. This means that the radius of the cell covered by the base station A 200 is extended to a radius X503 while the radius of the cell of the base station B 201 is shortened (micro-cellulated) to a radius "2R-X", as indicated at 504.

Figure 5:
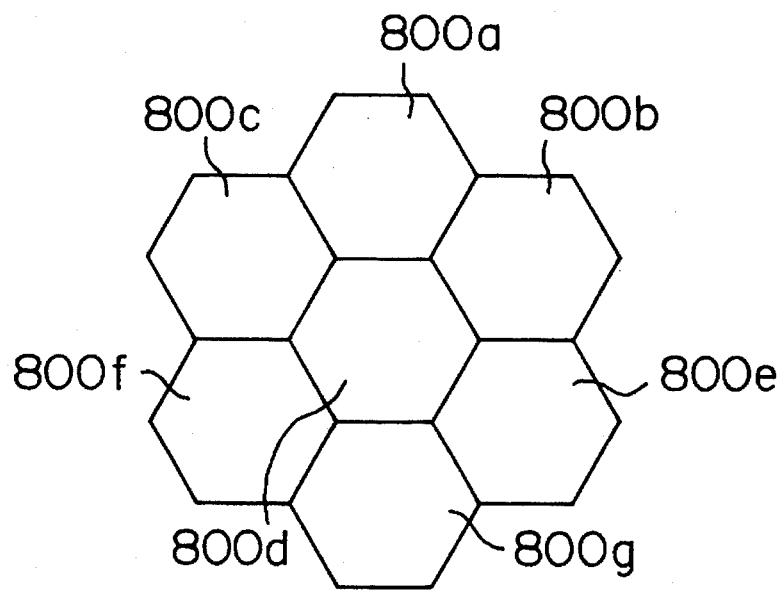
FIG. 5 is a schematic diagram illustrating a cell disposition or cell array in the normal operation mode of the cellular mobile communication system according to the invention.

FIG. 5 illustrates a cell disposition or array in the cellular mobile communication system according to the invention on the assumption that the pilot signal sending powers of the individual base stations are in the normal state (normal mode). In this state, the radii or areas of the individual adjacent cells 800 (800a–800g) are fundamentally identical with one another.

Figure 6:
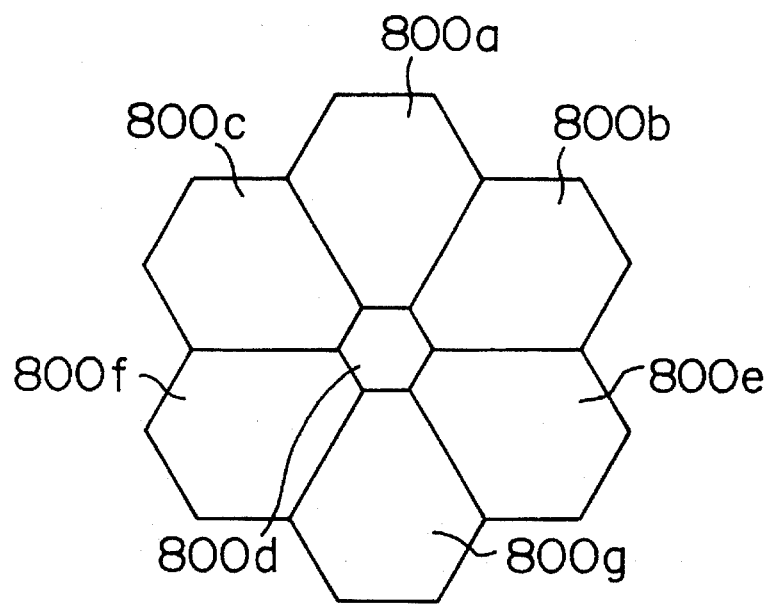
FIG. 6 is a schematic diagram illustrating a cell array in the state where inter-cell boundaries are changed in the cellular mobile communication system according to the invention.

FIG. 6 is a schematic diagram illustrating a cell array in which one of the cells is micro-cellulated or contracted by the pilot signal sending power control. More specifically, a cell 800d is micro-cellulated with the peripheral adjacent cells 800a to 800c and 800e to 800g being macro-cellulated (broadened). As can be seen from the figure, by micro-cellulating a single cell 800d, the mobile terminals connected to the base station which is in charge of controlling the cell 800d or the mobile terminals attempting access to that base station are handed over to the peripheral stations, whereby the traffic within the cell 800d can be mitigated. In this case, since maximum number of accesses to each base station remains invariable, the number of permissible accesses per unit area increases within the cell 800a undergone the micro-cellulation in the equivalent sense, making thus it possible to process normally the communications with the mobile terminals even in the district where the traffic is temporarily concentrated such as in the area around a railway station during a rush-hour period.

Figure 7:
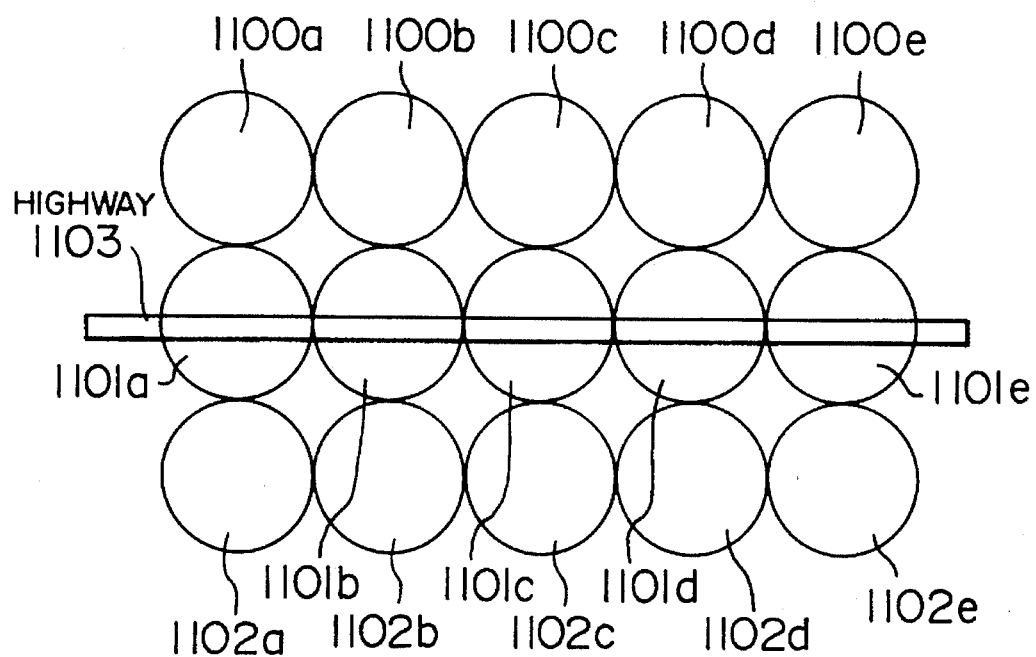
FIG. 7 is a schematic diagram showing another example of cell array in a cellular mobile communication system.

FIG. 7 is a schematic diagram showing an array of cells along a trunk road (or a highway) 110 as a particular example of application of the invention. In the figure, reference symbols 1101a to 1101e denote the cells arrayed over the trunk road 1103, while reference numerals 1100a to 1100e and 1102a to 1102e denote cells arrayed along and in the vicinity of the trunk road 1103. In the state illustrated in FIG. 7, it is assumed that the individual base stations operate in the normal mode where the radii or areas of the individual cells are equal to one another.

Figure 8:
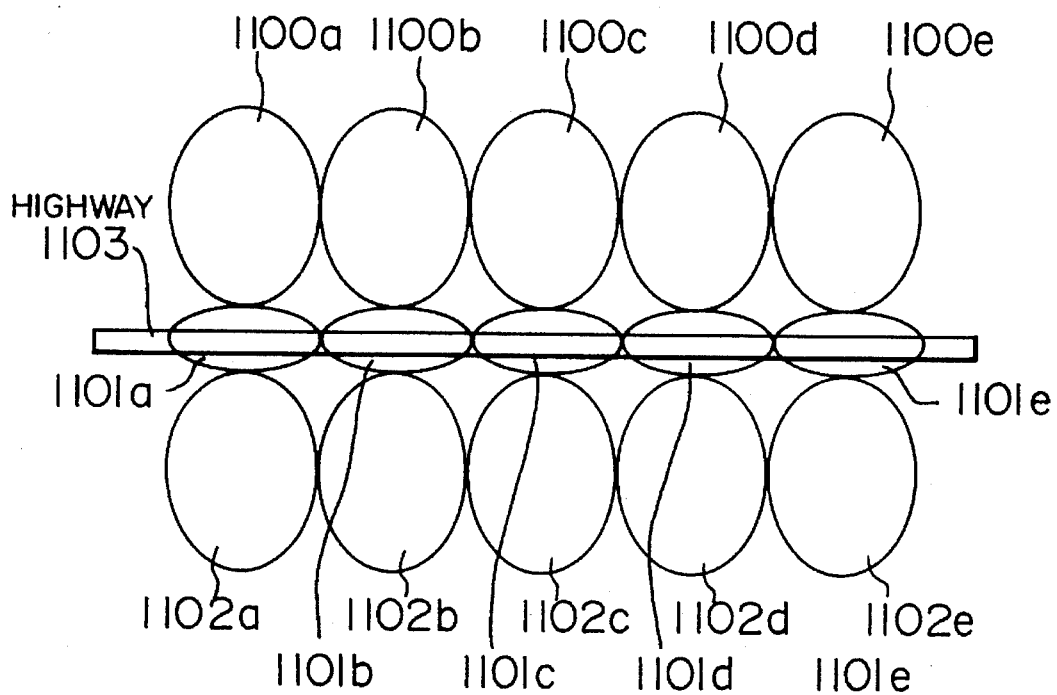
FIG. 8 is a schematic diagram for illustrating changes or modifications of cells brought about by applying the teaching of the invention to the communication system having the cell array shown in FIG. 7.

On the other hand, FIG. 8 shows a cell array in which the cells 1101a to 1101e lying over the trunk road 1103 are uniformly micro-cellulated (i.e., scaled-down). In this conjunction, it will readily be understood that by locally and/or selectively micro-cellulating the cells 1101a to 1101e spanned over the trunk road 1103 in dependence on the traffic density or congestion of the mobile terminals, the micro-cells can be positioned in the areas where the density of communication demand is high, to thereby cope with an increased communication demand or load without difficulty.

Figures 9, 10:
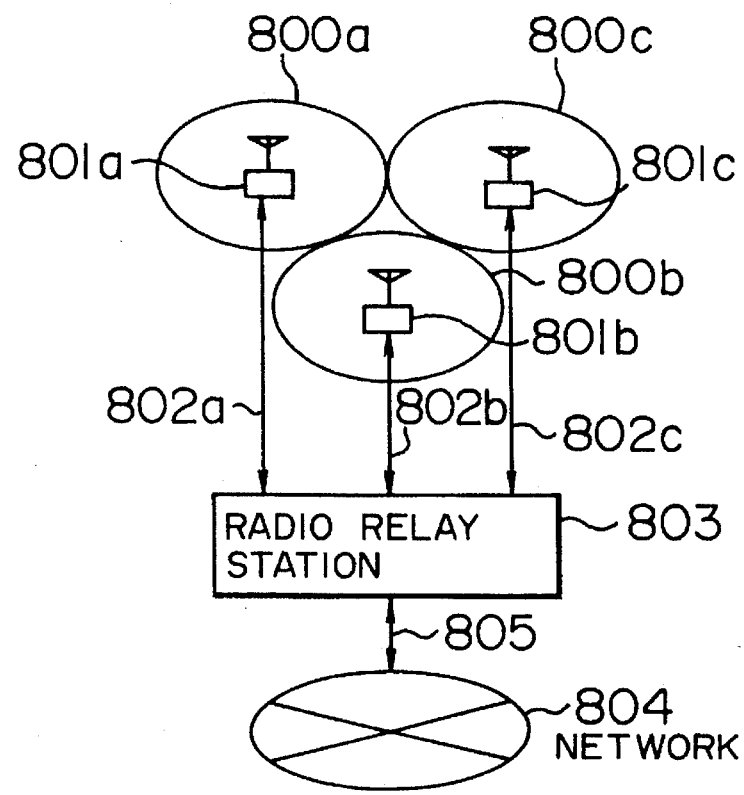
FIG. 9 is a schematic diagram showing, by way of example, a basic configuration of a cellular mobile communication system according to the invention.
FIG. 10 is a view showing a traffic manage table for the inter-cell boundary control corresponding to the second embodiment of the invention.

FIG. 9 shows, by way of example, a basic configuration of a cellular mobile communication system to which the present invention can be applied.

In the figure, reference numerals 800a, 800b, 800c, etc. (generally represented by 800) denote the cells which are under the control of the base stations 801a, 801b, 801c, etc. (generally denoted by 801), respectively, and a numeral 803 denotes a relay station for interconnecting the base stations mentioned above and a network 804. The relay station 803 may include an interchanger, wherein the individual base stations 801 are coupled to the relay station 803 via wire or wireless channels 802 (i.e., 802a, 802b, 802c, etc.). In the case of the illustrated example, the relay station 803 is realized as a radio relay station with the channels 802 being implemented wireless.

FIGS. 10 to 12 show, by way of example, structures of a traffic manage table which is managed by the relay station 803. Each of the traffic manage tables stores on a cell-by-cell basis the number of the mobile terminals being connected to the cell-associated base station (refer to columns labeled "NUMBER OF CONCURRENT ACCESSES") and states of a sending mode control signal (also referred to simply as mode control signal or more simply as control signal). A microprocessor which constitutes a control unit of the relay station supplies a mode control signal commanding changes of the sending power level to the base station which is subject to the micro-cellulation and/or the base station(s) for the adjacent cell(s) correspondingly.

In the case of the traffic manage table illustrated in FIG. 10, the traffic in the cell 800a is close to a maximum access number (e.g. "10"), while the traffics in the cells 800b and 800c are significantly low.

The relay station 803 monitors or supervises the traffics in the cells which are under the control of the base stations 801, respectively, and determines or selects the cell in which the traffic volume has attained or exceeds a predetermined threshold value (e.g. "9") as the subject for the micro-cellulation. In the case of the example illustrated in FIG. 10, the cell 800a is to be micro-cellulated. Accordingly, the relay station sends to the base station 801a controlling the cell 800a a control signal "−Δ" which commands lowering of amplification gain of the pilot signal sending power by "Δ" in decibels (dB).

In order to ensure a relatively stable transition of the system operation by avoiding steep change of the inter-cell boundary, it is desirable to select the value of "Δ" to be small so as to lies within a range of 1 to 2 dB. In the case of the example now under consideration, the control scheme according to the second embodiment of the invention described hereinbefore is adopted for the base stations 801b and 801c which are in charge of control of the cells 800b and 800c where the traffic is low in order to maintain or sustain the power amplification gain for the pilot signal sent to these stations as it is (i.e., in the current state). Parenthetically, it should be mentioned that for the base stations for which the current states are to be maintained, the current state sustain command may be sent when change of the amplification gain is commanded to the other station or alternatively no control signal may be supplied until there arises necessity for change of amplification gain in the relevant station.

FIG. 11 shows a structure of the traffic manage table in the case where the control scheme according to the first embodiment of the invention is to be adopted.

Referring to the figure, the relay station 803 sends the control signal "+Δ" commanding increase of the power amplification gain of the pilot signal to the base stations 801b and 801c in charge of controlling the cells 800b and 800c which are located adjacent to the cell 800a subjected to the micro-cellulation and which are to be macro-cellulated. In the base station 801a which is in charge of controlling the cell 800a, the power amplification gain for the pilot signal is maintained as it is. Decision as to which of the cells 801b and 801c is to be subjected to the macro-cellulation may be made, for example, by referencing a cell array information table which indicates the inter-cell positional relation and which is prepared separately from the traffic manage table mentioned above.

FIG. 12 shows a traffic manage table for the control mode corresponding to the third embodiment of the invention.

The relay station 803 sends the control signal "−Δ" commanding lowering of the power amplification gain of the pilot signal to the base station 801a which is in charge of control of the cell 800a subjected to the micro-cellulation, while sending the control signal "+Δ" commanding increase of the power amplification gain of the pilot signal to the base stations 801b and 801c which are to be macro-cellulated.

Figure 13A:
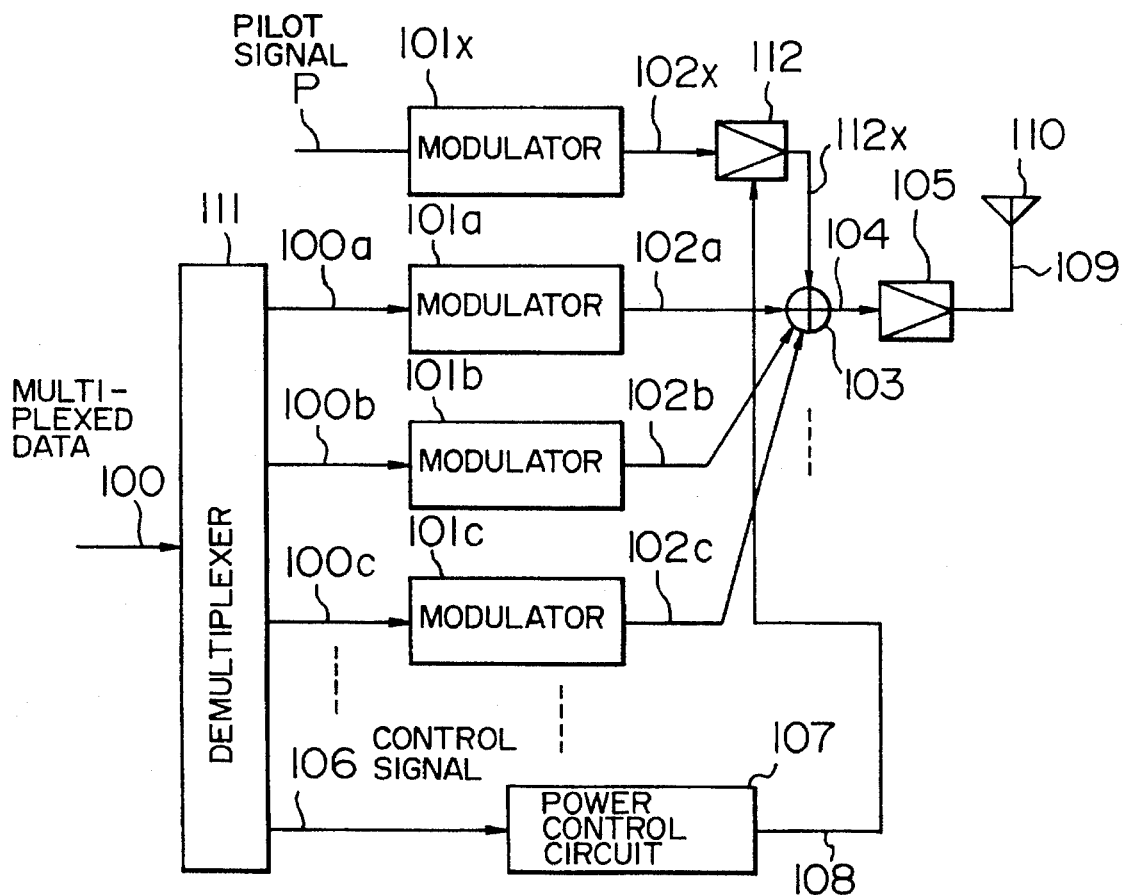
FIG. 13A is a schematic diagram showing, by way of example, a configuration of a transmission system in a base station constituting a part of a cellular mobile communication system according to the invention.

FIG. 13A shows, by way of example, a configuration of a transmission circuit system of a base station equipped with the inter-cell boundary control function according to the invention.

Referring to the figure, multiplexed data 100 containing signals for a plurality of channels is demultiplexed into a control signal 106 and data for transmission 100a, 100b, 100c, . . . , for the channels corresponding to the mobile terminals, respectively. These data for transmission are modulated to signals 102a, 102b, 102c, . . . , through modulators 101a, 101b, 101c, . . . , respectively. The pilot signal P is modulated to a signal 102x by a modulator 101x to be subsequently amplified to a signal 112x by an amplifier 112. The modulated pilot signal 112x and the data signals 102a, 102b, 102c, . . . , to be sent to the respective mobile terminals are combined to a single signal 104 by an adder 103. The output signal 104 of the adder circuit 103 is amplified to a signal 109 by an amplifier 105 to be subsequently broadcast in the air through the medium of an antenna 110. At this juncture, it should be mentioned that as the modulation system in which the sending data modulators 101x, 101a, 101b, 101c, . . . , are employed, there may be adopted any one of the FOMA, TDMA and CDMA systems mentioned hereinbefore and that the invention is never restricted to any particular system. Further, it should be added that the sending data modulators 101 may be so implemented that they can control the power gains for the associated channels, respectively. In that case, the sending power may be selected or adjusted in correspondence to the received signal strength (i.e., electric field intensity of the received signal) from the mobile terminal (which depends on the distance between the base station and the mobile terminal).

The control signal 106 separated from the multiplexed data by means of the demultiplexer 111 is supplied to a power control circuit 107 which is designed to generate a gain control signal 108 for determining the power amplification gain of the amplifier 112 destined for amplifying the pilot signal in accordance with the control signal as inputted. The amplifier 112 amplifies the power of the modulated pilot signal 102x with a gain determined in dependence on the gain control signal 108 mentioned above. Parenthetically, the control signal 106 may be supplied from the relay station 803 shown in FIG. 8.

Figure 13B:
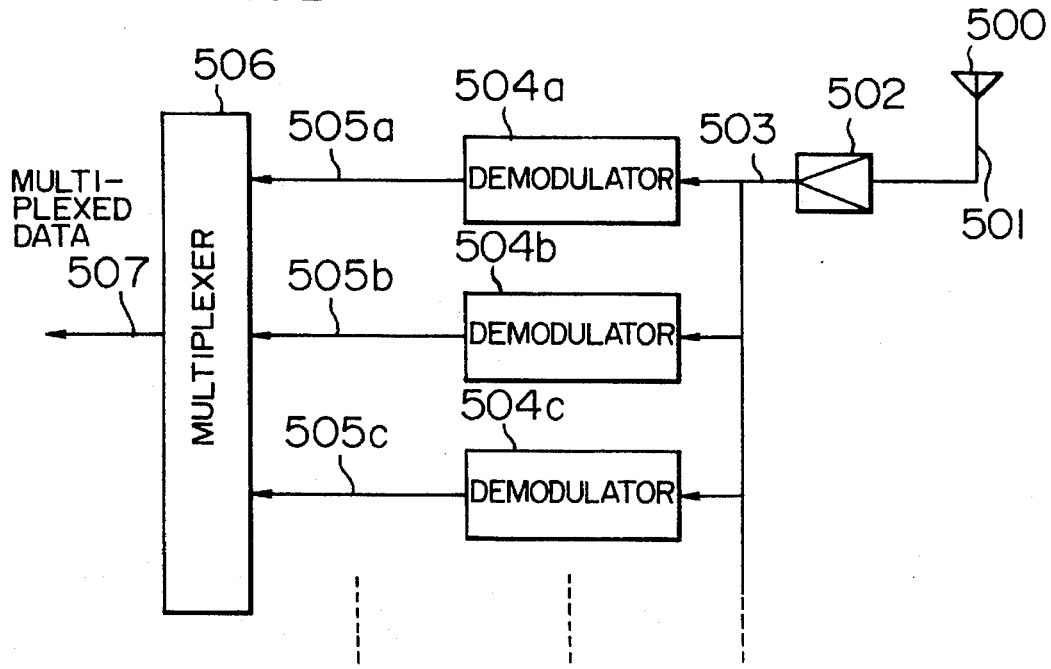
FIG. 13B is a schematic diagram showing, by way of example, a configuration of a receiver system in a base station constituting a part of the cellular mobile communication system according to the invention.

FIG. 13B shows, by way of example, a configuration of a reception circuit system in a base station equipped with the inter-cell boundary control facility according to the invention.

Referring to the figure, a radio signal 501 received by an antenna 50 is first inputted to an input amplifier 502 to be amplified to a signal 503 having a level within a range in which demodulators 504a, 504b, 504c, . . . , can operate normally. The amplified signal 503 is converted into demodulated signals through demodulators 504a, 504b, 504c, . . . , provided in correspondence to the mobile terminals, respectively. The demodulated signals 505a, 505b, 505c, . . . , are multiplexed by a multiplexer 506 to be transmitted as a multiplexed data signal 507 to a relay station 803 through wire or wireless communication. In this way, communication is established between the mobile terminal and the relay station 803, whereby speech communication can be performed with other mobile terminal or stationary terminal via the relay station and other base station or a network.

Parenthetically, in the case where such control scheme is adapted that for the base station of the cell for which the traffic has increased, the sending power is increased, a traffic monitor may be incorporated in each of the base stations so that each base station can perform by itself the microcellulation as well as clearing thereof independent of the other stations.

FIG. 14 shows a configuration of a transmission circuit system in a base station imparted with the inter-cell boundary control facility according to another embodiment of the invention. In this figure, circuit components same as or equivalent to those shown in FIG. 13A are denoted by like reference symbols. According to the teachings of the invention incarnated in the instant embodiment, a monitor circuit 113 is installed in the transmission system of the base station for monitoring the traffic on the basis of the multiplexed data, wherein when the traffic exceeds a predetermined threshold value, a control signal 106 commanding lowering of the gain for the pilot signal sending power amplification is sent to the sending power control circuit 107. Operations of the other circuit constituents are same as in the case of the system described hereinbefore by reference to FIG. 13A.

The control scheme illustrated in FIG. 14 can be realized with the third embodiment of the invention (although it can not be realized with the arrangements according to the first and second embodiments), whereby the size of the cell can easily be changed solely by imparting the function to cope with the increased traffic to the base station for which high density of the traffic is expected without need for modifying either the relay station or the other existing base stations.

Figure 15:
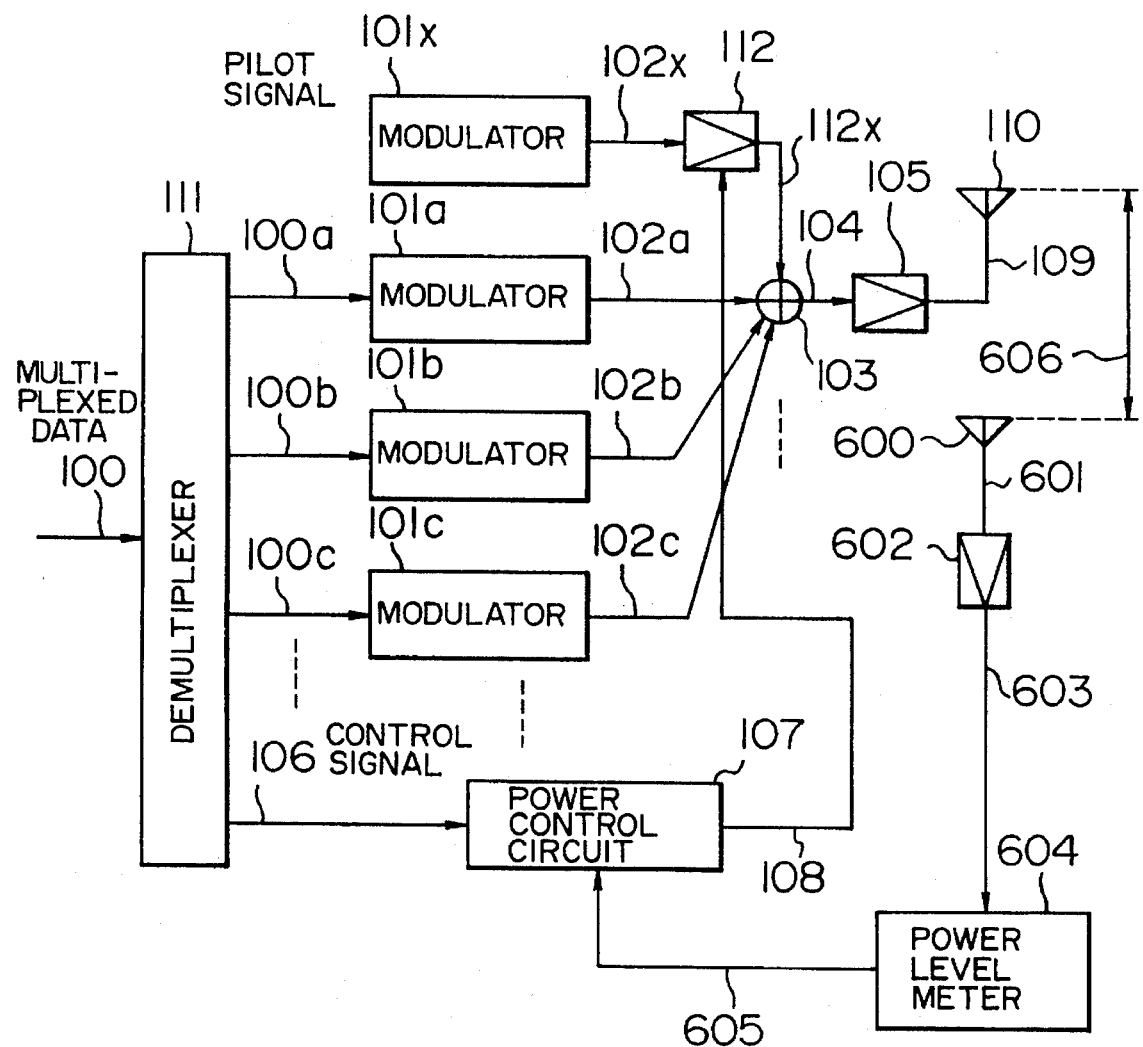
FIG. 15 is a schematic diagram showing a configuration of a transmitter system in a base station according to yet another embodiment of the invention.

FIG. 15 shows a configuration of a transmission system in the base station equipped with the inter-cell boundary control function according to yet another embodiment of the invention. In this figure, circuit components same as or equivalent to those described hereinbefore by reference symbols and repeated description thereof is omitted.

Referring to FIG. 15, an auxiliary receiving antenna 600 is disposed in the vicinity of a sending antenna 110, wherein a signal 601 received by the auxiliary antenna 600 is amplified by an amplifier 602, the signal 603 outputted from the amplifier 602 is supplied to an electric field strength meter or power level meter 604 which is designed to derive a received power level signal 605 by determining a mean value over a predetermined period by adopting, for example, envelope detection technique or the like. The received power level signal 605 is then inputted to the power control circuit 107.

With the arrangement according to the instant embodiment of the invention, a signal proportional to the actual sending power received through the auxiliary antenna 60 is fed back to the power control circuit 107 with a view to correcting the gain control signal 108, whereby the control of the sending power of the pilot signal broadcast from the antenna 110 can be performed with higher accuracy.

In this conjunction, it should be appreciated that by standardizing the distance 606 between the sending antenna 110 and the auxiliary antenna 600 so that the distance 606 is same for all the base stations, there arises no necessity to employ the power level meter (electric field strength meter) 604 and/or the power control circuit 107 specific to each of the base stations. When the distance 606 between the sending antenna 110 and the auxiliary receiving antenna 600 can not be standardized for some reason, the power level meter 604 or the power control circuit 107 may be so adjusted that the feedback equivalent to that of the standard inter-antenna distance arrangement is made effective.

FIG. 16 is a schematic diagram showing a structure of a sending antenna having directivities, which structure can be adopted in the base stations in carrying out the present invention. The illustrated antenna is constituted by a plurality of sector antennas 700, 701, 702, . . . , each having a directivity in a specific direction, wherein the individual sector antennas 700, 701, 702, . . . , bear burden of communications in specific sectors a703, b704, c705, . . . , respectively. By using the antenna having a plurality of sector antennas in this way, the sending power gain control for the pilot signal described hereinbefore can be performed on a sector-by-sector basis, whereby expansion or contraction of the cell size can be effected on a cell-by-cell basis.

FIG. 17 illustrates sending power controls performed by the base station and the mobile terminals for the channel data on the assumption that the CDMA modulation scheme is adopted. It is further assumed for simplification and facilitation of description that the cellular mobile communication system is comprised of two cells covered by base stations A 200 and B 201, wherein at locations e, f and g distanced from the base station B by R/6, R/2 and 5R/6, respectively, n traffics 1304, 1305 and 1306 take place, respectively.

When the sending power of the pilot signal of each base station is in the normal state (i.e., in the normal mode), the boundary between the cells which are under the control of the aforementioned two stations is defined at a location or place c (position indicated by a left-hand broken line) which is equidistant from the position a of the base station A and the position b of the base station B. It is now assumed that the inter-cell boundary is shifted from the location c in the normal mode to a location d (position indicated by a right-hand broken line) displaced by R/3 in the direction toward the base station B.

First, the sending power of the mobile terminal is considered. The reuse ratios $F_A$ and $F_B$ of the frequencies for the base stations A and B are given by the following expressions (1) and (2), respectively, on the assumption that the electromagnetic wave undergoes attenuation in proportion to a square of the distance:

$$F_A = \frac{N\sigma_A}{N\sigma_A + \frac{(R/2)^2}{(3R/2)^2} N\sigma_B + \frac{(R/6)^2}{(11R/6)^2} N\sigma_B} = \quad \text{(Eq. 1)}$$

$$\frac{\sigma_A}{\sigma_A + \frac{1}{3^2}\sigma_B + \frac{1}{11^2}\sigma_B}$$

$$F_B = \frac{2N\sigma_B}{2N\sigma_B + \frac{(7R/6)^2}{(5R/6)^2} N\sigma_A} = \frac{2\sigma_B}{2\sigma_B + \frac{7^2}{5^2}\sigma_A} \quad \text{(Eq. 2)}$$

where $\sigma_A$ and $\sigma_B$ represent received powers from mobile terminals existing within the cells of the base stations A and B, respectively. Assuming that $\sigma_A$ and $\sigma_B$ remain constant independent of the intra-cell positions of the mobile terminals, the condition for maximizing the frequency utility efficiency resides in that the frequency reuse ratios $F_A$ and $F_B$ in the cells of the base stations A and B are made proportional to the traffic volume. This condition is given by the following expression (3):

$$\frac{F_A}{N} = \frac{F_B}{2N} \quad \text{(Eq. 3)}$$

By solving the expressions (1) and (2) for $\sigma_B/\sigma_A$ of on the condition given by the expression (3), then $$\sigma_B/\sigma_A = 11.24$$

Thus, the frequency reuse ratios $F_A$ and $F_B$ for the base stations A and B can be determined as "0, 43" and "0.85", respectively.

In the normal mode state in which the inter-cell boundary is positioned at the point c, no mobile terminal is found within the cell of the base station A while the traffic volume in the cell of the base station B are maximum. Accordingly, the corresponding frequency reuse ratios $F_A$ and $F_B$ are "0" and "1", respectively. Assuming that the maximum number of the concurrent accesses is 2.35N when the frequency reuse ratio is "1", the traffic volume corresponding to 22% of all the mobile terminals found within the cell of the base station A (where 22%=(3N−2.35N)/3N×100) can not be used for the call in the normal mode state.

In contrast, by shifting the inter-cell boundary to a point or location d by performing the sending power control of the base station according to the present invention, N (=2.35N× 0.43) traffics 1306 are connected to the base station A while connected to the base station B are 2N (2.35N×0.85) traffics 1304 and 1305 in total. Thus, 3N traffics in sum total can be made available according to the teachings of the invention.

Next, description will turn to the sending power control for the channel data of the base station. The condition for maximizing the frequency use ratio is to make constant the signal-to-noise ratio over the individual mobile terminals. Assuming that the sending power of the base station B for the traffic 1304 is "1", the sending power of the base station B for the traffic 1305 is "a", and that the sending power of the base station A for the traffic 1306 is "b", the condition for maximizing the frequency usability is given by the following equation (4):

$$\frac{1}{1+a+\frac{b}{11^2}} = \frac{\frac{a}{3^2}}{\frac{1+a}{3^2}+\frac{b}{9^2}} = \frac{\frac{b}{7^2}}{\frac{1+a}{5^2}+\frac{b}{7^2}} = \gamma \quad \text{(Eq. 4)}$$

By solving the above equation (4) for the variables a, b and $\gamma$, then $$a=1.166, b=3.551, \text{ and } \gamma=0.455,$$

where $\gamma$ represents the signal-to-noise ratio before spectrum de-spreading in the mobile terminal. Parenthetically, the signal-to-noise ratio before the spectrum de-spreading in the normal mode state where the inter-cell boundary is located at the point c is 0.333. Since the signal-to-noise ratio is in proportion to the maximum number of concurrent accesses, the latter can be increased about 37% (=(0.45+0.333−1)× 100) by applying the teachings of the invention.

When the FDMA or TDMA scheme is adopted instead of the CDMA described above as the multiple access scheme, the power level of the electromagnetic wave cast by the base station and the mobile terminals should be so selected that a desired communication quality can be ensured for both the base station and the mobile terminals for the cell where the same frequency is repeated.

As is apparent from the foregoing description, it becomes possible according to the invention to change the size of cells by controlling the sending power of the pilot signal launched from the base station in accordance with the traffic quantity which varies in dependance on the locations and the time zones, whereby the communication of a same scale can be covered with a smaller number of cells when compared with prior art technique.

We claim:

1. A cellular mobile communication system, comprising:

a relay station connected to a network;

a plurality of base stations connected to said relay station via communication channels and defining cells, respectively;

first means for monitoring volume of traffic between mobile terminals resident within each of said cells and the base station located within each of said cells; and second means for controlling a boundary between a given one of said cells and a plurality of the cells adjacent to said given one in accordance with the traffic volume;

wherein said second means comprises means for changing the sending power of a pilot signal emitted from a given base station located within a given one of said cells and the sending power of a pilot signal emitted from a neighboring base station located within the cell adjacent to said given cell relative to each other in accordance with an output signal of said first means, the sending power of pilot signals emitted from the base stations being controlled independent of the sending power of transmission data from the base stations to the mobile terminals, said second means controlling the boundary between mutually adjacent cells based on the power level of a pilot signal received from each of said base stations.

2. A cellular mobile communication system according to claim 1, wherein when the traffic volume in said given one cell exceeds a predetermined threshold, said first means sends said output signal to said second means, and wherein said second means changes the sending power of a pilot signal at least in one of said given one base station and said neighboring base stations so that the cell of said given one station is contracted.

3. A cellular mobile communication system according to claim 2, wherein said second means lowers the sending power of the pilot signal of said given one base station.

4. A cellular mobile communication system according to claim 2, wherein said second means increases the sending power of the pilot signal of at least one of said neighboring base stations.

5. A cellular mobile communication system according to claim 2, wherein said second means lowers the sending power of the pilot signal of said given one base station while raising the sending power of the pilot signal of at least one of said neighboring base stations.

6. A cellular mobile communication system according to claim 1, wherein said first means is provided in said relay station;

said second means being provided in each of said plural base stations; and wherein when traffic volume in said given one cell exceeds a predetermined threshold value, said relay station sends said output signal to more than one base station inclusive thereof via said channel.

7. A cellular mobile communication system according to claim 6, wherein said relay station sends said output signal to said given one base station; and wherein said second means lowers the sending power of the pilot signal of said given one base station in accordance with said control signal.

8. A cellular mobile communication system according to claim 6, wherein said relay station sends said output signal to at least one of said neighboring base stations; and wherein said second means raises the sending power of the pilot signal of at least one of said neighboring base stations in accordance with said control signal.

9. A cellular mobile communication system according to claim 6, wherein said relay station sends said output signal to at least one of said neighboring base stations and said given one base station; and wherein said second means lowers the sending power of the pilot signal of said given one base station while raising the sending power of the pilot signal of at least one of said neighboring base stations in accordance with said control signal.

10. A radio base station constituting a part of a cellular mobile communication system, comprising:

a receiver; and a transmitter;

wherein said transmitter includes:

first modulating means for modulating a pilot signal, variable gain amplifying means for amplifying the modulated pilot signal, demultiplexing means for demultiplexing multiplexed data transmitted from a relay station to obtain transmission data to be transmitted to mobile stations and a control signal being made in response to a change in traffic volume, a plurality of second modulating means for modulating said transmission data, adding means for combining the modulated transmission data and the modulated and amplified pilot signal, amplifying means for amplifying the output signal of said adding means, sending means for broadcasting the combined and amplified signal as an electromagnetic wave, and gain control means for controlling power gain of said variable gain amplifying means in response to input of said control signal.

11. A radio base station according to claim 10, wherein said gain control means lowers said power gain when traffic volume in said base station exceeds a predetermined threshold value.

12. A radio base station according to claim 10, wherein said gain control means raises said power gain when a traffic volume in at least one of neighboring base stations located adjacent to said base station exceeds a predetermined threshold value.

13. A radio base station according to claim 10, wherein said sending means includes a plurality of antenna members having respective directivities differing from one another; and wherein said gain control means performs power gain controls in correspondence to said plurality of antenna members, respectively.

14. A radio base station according to claim 10, further comprising:

auxiliary receiving means for detecting a strength of said electromagnetic wave broadcast by said sending means; and means for feeding back a detection output of said auxiliary receiving means to said gain control means.

15. A radio base station constituting a part of a cellular mobile communication system, comprising:

a receiver; and a transmitter;

wherein said transmitter includes:

first modulating means for modulating a pilot signal, variable gain amplifying means for amplifying the modulated pilot signal, demultiplexing means for demultiplexing multiplexed data transmitted from a relay station to obtain transmission data to be transmitted to mobile stations, a plurality of second modulating means for modulating said transmission data, adding means for combining the modulated transmission data and the modulated and amplified pilot signal, amplifying means for amplifying the output signal of said adding means, sending means for broadcasting the combined and amplified signal as an electromagnetic wave, monitoring means for monitoring a change in traffic volume in said base station based on the multiplexed data to thereby output a control signal when said traffic volume exceeds a predetermined threshold value, and gain control means for controlling power gain of said variable gain amplifying means in response to said control signal, wherein said gain control means lowers said power gain of said variable gain amplifying means in response to said control signal.

* * * * *